(12) United States Patent
Storey

(10) Patent No.: US 11,510,375 B2
(45) Date of Patent: *Nov. 29, 2022

(54) VERTICAL HYDROPONIC PLANT PRODUCTION APPARATUS

(71) Applicant: University of Wyoming, Laramie, WY (US)

(72) Inventor: Nathaniel R. Storey, Laramie, WY (US)

(73) Assignee: University of Wyoming, Laramie, WY (US)

( * ) Notice: Subject to any disclaimer, the term of this patent is extended or adjusted under 35 U.S.C. 154(b) by 258 days.

This patent is subject to a terminal disclaimer.

(21) Appl. No.: 16/856,644

(22) Filed: Apr. 23, 2020

(65) Prior Publication Data

US 2020/0315113 A1 Oct. 8, 2020

Related U.S. Application Data

(63) Continuation of application No. 15/098,744, filed on Apr. 14, 2016, now Pat. No. 10,638,677, which is a
(Continued)

(51) Int. Cl.
*A01G 31/02* (2006.01)

(52) U.S. Cl.
CPC .............. *A01G 31/02* (2013.01); *Y02P 60/21* (2015.11)

(58) Field of Classification Search
CPC ........... A01G 9/02; A01G 31/02; A01G 31/06
See application file for complete search history.

(56) References Cited

U.S. PATENT DOCUMENTS 2,152,869 A 4/1939 Campbell
2,292,619 A 8/1942 De
(Continued)

FOREIGN PATENT DOCUMENTS

CA 2284389 C 2/2004
EP 2030503 A1 3/2009
(Continued)

OTHER PUBLICATIONS

"Assembling a Vertical Hydroponics System," Bright Agrotech, Upstart University, https://www.slideshare.net/BrightAgrotech/greenwall-assembly-instructions-v1, Jun. 3, 2014, 28 slides.
(Continued)

*Primary Examiner* — Peter M Poon
*Assistant Examiner* — Kari A Bradberry
(74) *Attorney, Agent, or Firm* — Weatherly IP Solutions, LLC; James M. Weatherly

(57) ABSTRACT

A vertical hydroponic plant production apparatus for allowing vertical hydroponic greenhouse crop production is provided. The apparatus comprises a hollow grow tube having a front face, a back face, an open first end, and an open second end. A slot is formed in the front face of the grow tube with the slot having a width equal to only a portion of a width of the front face. A media material is insertable into the grow tube. The slot allows the front face to expand outward during insertion of the media material and biased inward against the media material once the media material is inserted. The grow tube is positionable in either a horizontal position, vertical position, or any position between the horizontal position and the vertical position allowing inclined, multi-angled crop production and multi-storied conveyor style crop production.

18 Claims, 11 Drawing Sheets

Related U.S. Application Data continuation-in-part of application No. 13/666,996, filed on Nov. 2, 2012, now Pat. No. 9,380,751, and a continuation-in-part of application No. 13/134,614, filed on Jun. 10, 2011, now Pat. No. 9,491,915, which is a continuation-in-part of application No. 12/804,931, filed on Aug. 2, 2010, now Pat. No. 8,327,582, said application No. 13/666,996 is a continuation-in-part of application No. 12/804,931, filed on Aug. 2, 2010, now Pat. No. 8,327,582.

(60) Provisional application No. 61/273,317, filed on Aug. 3, 2009.

(56) References Cited

U.S. PATENT DOCUMENTS

| | | |
|---|---|---|
| 3,018,586 A | 1/1962 | Lane |
| 3,368,303 A | 2/1968 | Duncan |
| 4,035,950 A | 7/1977 | Anselm |
| 4,070,793 A | 1/1978 | Dillon |
| 4,095,608 A | 6/1978 | Holmes |
| 4,175,355 A | 11/1979 | Dedolph |
| 4,216,617 A | 8/1980 | Schmidt |
| 4,268,994 A | 5/1981 | Urai |
| 4,310,990 A | 1/1982 | Payne |
| 4,415,137 A | 11/1983 | Garves |
| 4,454,684 A | 6/1984 | O'Hare |
| 4,476,651 A | 10/1984 | Drury |
| 4,566,607 A | 1/1986 | Smith |
| 4,932,158 A | 6/1990 | Roberts |
| 4,972,627 A | 11/1990 | Hori et al. |
| 5,097,627 A | 3/1992 | Roberts |
| 5,161,327 A | 11/1992 | Campbell et al. |
| 5,293,713 A | 3/1994 | Ahmed |
| 5,363,594 A | 11/1994 | Davis |
| 5,490,374 A | 2/1996 | Calande |
| 5,555,676 A | 9/1996 | Lund |
| 5,826,375 A | 10/1998 | Black |
| 5,987,812 A | 11/1999 | Knell |
| D420,554 S | 2/2000 | Evans |
| 6,615,542 B2 | 9/2003 | Ware |
| 6,725,601 B2 | 4/2004 | Chick |
| 6,727,091 B2 | 4/2004 | Darlington |
| 6,751,903 B2 | 6/2004 | Shryock |
| 6,840,007 B2 | 1/2005 | Leduc et al. |
| 6,840,008 B1 | 1/2005 | Bullock et al. |
| 6,951,076 B2 | 10/2005 | Winsbury |
| 7,188,451 B2 | 3/2007 | Marchildon |
| 7,640,409 B1 | 12/2009 | Stafford et al. |
| 7,788,848 B1 | 9/2010 | Koumoudis |
| 7,921,599 B2 | 4/2011 | Irwin |
| 8,122,642 B1 | 2/2012 | Huberman et al. |
| 8,327,582 B2 | 12/2012 | Storey |
| 8,438,781 B2 | 5/2013 | Zhao et al. |
| 8,542,823 B1 | 9/2013 | Nguyen et al. |
| 8,966,815 B1 | 3/2015 | Smiles |
| 8,984,808 B2 | 3/2015 | Daniels et al. |
| 9,110,963 B2 | 8/2015 | Burchett et al. |
| 9,226,457 B2 | 1/2016 | Laurence et al. |
| 9,374,947 B2 | 6/2016 | Meyer |
| 9,380,751 B2 | 7/2016 | Storey |
| 9,491,915 B2 | 11/2016 | Storey |
| D785,497 S | 5/2017 | Storey |
| D796,378 S | 9/2017 | Storey |
| D821,915 S | 7/2018 | Storey |
| D826,769 S | 8/2018 | Storey |
| D832,738 S | 11/2018 | Storey |
| 2001/0047617 A1 | 12/2001 | Blossom |
| 2003/0052398 A1 | 3/2003 | Utsumi |
| 2003/0089037 A1 | 5/2003 | Ware |
| 2003/0101645 A1 | 6/2003 | Cole et al. |
| 2003/0191938 A1 | 10/2003 | Woods et al. |
| 2004/0003289 A1 | 1/2004 | Bhogal et al. |
| 2004/0020114 A1 | 2/2004 | Boehmer et al. |
| 2004/0060491 A1 | 4/2004 | Leduc et al. |
| 2004/0103583 A1 | 6/2004 | Eriksen et al. |
| 2004/0200148 A1 | 10/2004 | Schuck et al. |
| 2005/0055878 A1 | 3/2005 | Dumont |
| 2005/0055879 A1* | 3/2005 | Darlington ............ A01G 31/02 47/62 R |
| 2005/0169073 A1 | 8/2005 | Cook et al. |
| 2006/0032128 A1 | 2/2006 | Bryan |
| 2006/0107589 A1 | 5/2006 | Rubin |
| 2006/0117656 A1 | 6/2006 | Graham et al. |
| 2006/0150485 A1 | 7/2006 | Somerville |
| 2006/0156624 A1 | 7/2006 | Roy et al. |
| 2006/0184540 A1 | 8/2006 | Kung et al. |
| 2006/0219853 A1 | 10/2006 | Molina et al. |
| 2006/0236604 A1 | 10/2006 | Hesse et al. |
| 2007/0062113 A1 | 3/2007 | Rubin et al. |
| 2007/0144069 A1 | 6/2007 | Gottlieb et al. |
| 2007/0214717 A1 | 9/2007 | Larwood |
| 2008/0034653 A1 | 2/2008 | Ramsey et al. |
| 2008/0184148 A1 | 7/2008 | Selig |
| 2008/0209804 A1 | 9/2008 | Stradiot |
| 2008/0295402 A1 | 12/2008 | Bindschedler et al. |
| 2009/0056221 A1 | 3/2009 | Ramsey et al. |
| 2009/0223126 A1 | 9/2009 | Garner et al. |
| 2009/0249460 A1 | 10/2009 | Fitzgerald et al. |
| 2009/0288341 A1* | 11/2009 | Kania .................... A01G 9/28 47/64 |
| 2010/0095584 A1 | 4/2010 | Huet et al. |
| 2010/0250892 A1 | 9/2010 | Logan et al. |
| 2010/0299993 A1* | 12/2010 | Lais .................. A01G 13/0243 47/29.1 |
| 2010/0318997 A1 | 12/2010 | Li et al. |
| 2011/0016782 A1 | 1/2011 | Harder |
| 2011/0016784 A1 | 1/2011 | Taber |
| 2011/0232188 A1 | 9/2011 | Kennedy |
| 2012/0000128 A1 | 1/2012 | Rochefort |
| 2012/0066972 A1 | 3/2012 | Lin |
| 2012/0173655 A1 | 7/2012 | Mcentee |
| 2013/0067813 A1 | 3/2013 | Storey |
| 2013/0219788 A1 | 8/2013 | VanLente |
| 2013/0268545 A1 | 10/2013 | Burchett et al. |
| 2013/0305039 A1 | 11/2013 | Gauda |
| 2013/0340337 A1 | 12/2013 | Kuo et al. |
| 2014/0020292 A1 | 1/2014 | McNamara et al. |
| 2014/0115960 A1 | 5/2014 | Kantola et al. |
| 2014/0259904 A1 | 9/2014 | Collard |
| 2015/0324146 A1 | 11/2015 | Xiao et al. |
| 2015/0342127 A1 | 12/2015 | Gallant |
| 2016/0132528 A1 | 5/2016 | Roubaud et al. |
| 2016/0227722 A1 | 8/2016 | Storey |
| 2017/0171295 A1 | 6/2017 | Sung et al. |
| 2018/0232396 A1 | 8/2018 | Arab et al. |

FOREIGN PATENT DOCUMENTS

| | | |
|---|---|---|
| GB | 2265536 A | 10/1993 |
| GB | 2343829 B | 11/2003 |
| JP | H0614665 A | 1/1994 |
| JP | 2014212701 A | 11/2014 |
| WO | 2005025299 A1 | 3/2005 |
| WO | 2011016856 A1 | 2/2011 |
| WO | 2015175415 A1 | 11/2015 |
| WO | 2016053781 A1 | 4/2016 |

OTHER PUBLICATIONS

Australian Patent Office Search Report, (Application No. 201081721) dated Jul. 312015.

European Patent Office Action, (Application No. 10806748.9) dated Jul. 19, 2016.

European Patent Office Search Report, (Application No. 10806748.9) dated Apr. 21, 2015.

European Patent Office Search Report, (Application No. 17195489.4) dated Feb. 28, 2018.

Horton, Robin, "Vertical Farming on Rise for Urban Food Supply", Urban Gardens, Jul. 9, 2010, 5 pages.

(56) References Cited

OTHER PUBLICATIONS

Idowning, Lois, "Planning and Building Green Walls," https://blog.brightagrotech.com/planning-and-building-green-walls/, Aug. 20, 2013, 10 pages.
International Search Report, PCT/US15/52166, dated Dec. 21, 2015.
Michael, Chris, "What is a Living Green Wall?," https://blog.brightagrotech.com/what-is-a-living-green-wall/, Aug. 28, 2014, 9 pages.
Michael, Chris, "ZipGrow Living Green Walls at ASLA 2014," https://blog.brightagrotech.com/zipgrow-living-green-walls-asla-2014/, Nov. 20, 2014, 9 pages.
PCT/US2010002157—International Search Report, dated Apr. 21, 2015.
Peters, Adele, "These Vertical Farms Turn Unused City Wall Space Into Gardens That Grow Your Lunch," Fast Company, https://www.fastcompany.com/3052538/these-vertical-farms-turn-unused-city-wall-space-into-gardens-that-grow-your-lunch, Oct. 23, 2015, 6 pages.
Response to European Patent Office Action, (Application No. 10806748.9) dated Jan. 19, 2017.
Sam, "Green Wall Update (Frozen in Time)—Nov. 10, 2014," Bright Agrotech, https://youtu.be/kraa_d3ddRg, Nov. 11, 2014, 2:07 minutes, 1 page.
Sam, "How Do Living Green Walls Work?," Bright Agrotech, https://youtu.be/LdBDtP1mcxU, Sep. 19, 2014, 2:49 minutes, 1 page.
Sam, "Laramie Green Wall Update Snow Edition (Nov. 3, 2014)," Bright Agrotech, https://youtu.be/zvjTgSVX5s4, Nov. 3, 2014, 1:10 minutes, 1 page.
Sam, "September Green Wall Update," Bright Agrotech, https://youtu.be/VmVhoBAd6KU, Sep. 30, 2014, 1:22 minutes, 1 page.
Smith, Damon, "Assembling a ZipGrow Farm Wall," Upstart University, https://www.slideshare.net/BrightAgrotech/assembling-a-zipgrow-farm-wall, Sep. 21, 2015, 40 slides.
Storey, Amy, "The Evolution of the ZipGrow Farm Wall Design," https://blog.brightagrotech.com/the-evolution-of-the-zipgrow-farm-wall-design/, Jul. 23, 2015, 10 pages.
Storey, Amy, "The Many Benefits of Living Walls," https://blog.brightagrotech.com/the-many-benefits-of-living-walls/, Jun. 12, 2015, 13 pages.
Storey, Amy, "What Happens When Restaurants Become Urban Farms?," https://blog.brightagrotech.com/what-happens-when-restaurants-become-urban-farms/, Sep. 30, 2015, 6 pages.
Storey, Nate, "How Do Green Walls Work?," Bright Agrotech, https://youtu.be/y_DXn4YdkBQ, Aug. 15, 2013, 5:22 minutes, 1 page.
Storey, Nate, "World's First Aquaponic Living Green Wall," Bright Agrotech, https://youtube/zO_GeRDU2x0, Aug. 13, 2013, 5:40 minutes, 1 page.

\* cited by examiner

VERTICAL HYDROPONIC PLANT PRODUCTION APPARATUS

CROSS REFERENCE TO RELATED APPLICATIONS

The present application is a continuation of and claims priority to U.S. application Ser. No. 15/098,744, filed on Apr. 14, 2016, which is a continuation-in-part of U.S. Pat. No. 9,380,751, issued on Jul. 5, 2016, which is a continuation in part of U.S. Pat. No. 8,327,582, issued Dec. 11, 2012, which claims benefit of priority of provisional patent application Ser. No. 61/273,317, filed on Aug. 3, 2009, entitled "Vertical Hydroponic Plant Production Apparatus". U.S. application Ser. No. 15/098,744, filed on Apr. 14, 2016, is also a continuation-in-part of U.S. Pat. No. 9,491,915, issued on Nov. 15, 2016, which is a continuation in part of U.S. Pat. No. 8,327,582, issued Dec. 11, 2012, which claims benefit of priority of provisional patent application Ser. No. 61/273,317, filed on Aug. 3, 2009, entitled "Vertical Hydroponic Plant Production Apparatus", the entire contents of these applications are herein incorporated by reference for all they teach and disclose.

BACKGROUND

This invention relates generally to a vertical hydroponic plant production apparatus and, more particularly, the invention relates to a vertical hydroponic plant production apparatus allowing for vertical hydroponic greenhouse crop production in a fraction of the space necessary for traditional plant production techniques and allowing utilization of vertical surfaces for plant production.

Traditional hydroponics has focused primarily on horizontal production techniques and has been subject to major space constraints. Vertical hydroponic applications have either been impractical, expensive to operate, or inefficient. Often these applications utilize some type of growth medium that is heavy when saturated, causing clogging when filled with plant roots, and/or requiring a great deal of maintenance. In addition, conventional technology makes it difficult to allow in-store display of live, growing vegetables and is not conducive to "you-pick" vegetable and herb sales to customers. Little technology exists that allows vertical plant displays that are highly scalable.

SUMMARY

The present invention is a vertical hydroponic plant production apparatus for allowing vertical hydroponic greenhouse crop production. The apparatus comprises a hollow grow tube having a front face, a back face, an open first end, and an open second end, wherein the grow tube has a shape selected from the group consisting of substantially square, rectangular, round, oval, octagon, pentagon and triangular. A slot is formed in the front face of the grow tube with the slot having a width equal to only a portion of a width of the front face. A media material is insertable into the grow tube. The slot allows the front face to expand outward during insertion of the media material and biased inward against the media material once the media material is inserted. The grow tube is positionable in either a horizontal position, vertical position, or any position between the horizontal position and the vertical position allowing inclined, multi-angled crop production and multi-storied conveyor style crop production.

In addition, the present invention includes a method for allowing vertical hydroponic greenhouse crop production. The method comprises providing a hollow grow tube having a front face, a back face, a first end, and a second end, wherein the grow tube has a shape selected from the group consisting of substantially square, rectangular, round, oval, octagon, pentagon and triangular, forming a slot in the front face of the grow tube with the slot having a width equal to only a portion of a width of the front face, inserting a media material into the grow tube, expanding the front face outward during insertion, biasing the front face inward against the media material, and positioning the grow tube in either a horizontal position, vertical position, or any position between the horizontal position and the vertical position allowing inclined, multi-angled crop production and multi-storied conveyor style crop production.

The present invention further includes a vertical hydroponic plant production apparatus for allowing vertical hydroponic greenhouse crop production. The apparatus comprises a hollow grow tube having a front face, a back face, a first end, and a second end, wherein the grow tube has a shape selected from the group consisting of substantially square, rectangular, round, oval, octagon, pentagon and triangular. A slot is formed in the front face of the grow tube with the slot having a width equal to only a portion of a width of the front face. A media material is insertable into the grow tube with the media material being composed of two halves of material split down the middle with a bolt spanning the width of the two halves for joining the two halves. A pulling hook is provided having a flat portion for grasping the bolt for inserting and removing the media material from the grow tube. An "H" bracket having a receiving portion and an anchoring portion, the "H" bracket is mounted to the rear face of the grow tube. A "Z" bracket having a vertical, upward facing tongue portion receivable within the receiving portion of the "H" bracket is provided with the "Z" bracket mounted in a predetermined location. An aperture is formed in the "Z" bracket for receiving a fastening mechanism. The grow tube is positionable in either a horizontal position, vertical position, or any position between the horizontal position and the vertical position allowing inclined, multi-angled crop production and multi-storied conveyor style crop production. The slot allows the front face to expand outward during insertion of the media material and biased inward against the media material once the media material is inserted. As weight is applied to the tongue portion of the "Z" bracket through the placement of a grow tube, downward torque is applied across the "Z" bracket causing a clutch action to affix the "Z" bracket tightly to the predetermined location.

DETAILED DESCRIPTION

Figure 1:
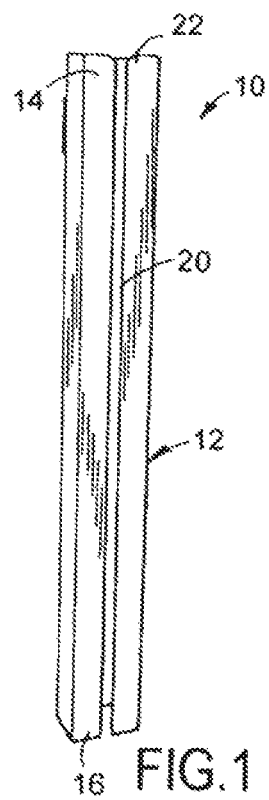
FIG. 1 is a front perspective view illustrating a grow tube of a vertical hydroponic plant production apparatus, constructed in accordance with the present invention.
Figure 2:
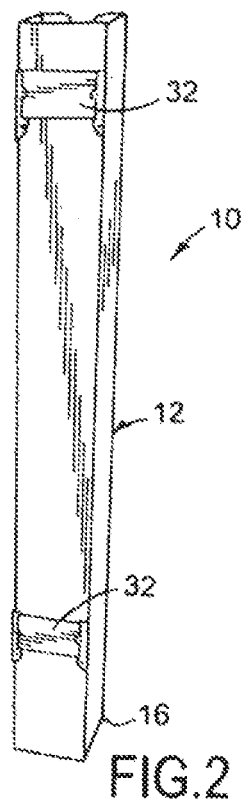
FIG. 2 is a rear perspective view illustrating the grow tube of the vertical hydroponic plant production apparatus of FIG. 1, constructed in accordance with the present invention.
Figure 3:
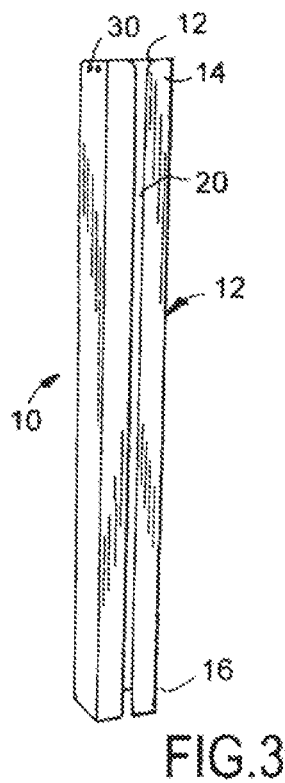
FIG. 3 is a front perspective view illustrating another embodiment of the grow tube of the vertical hydroponic plant production apparatus, constructed in accordance with the present invention.
Figure 4:
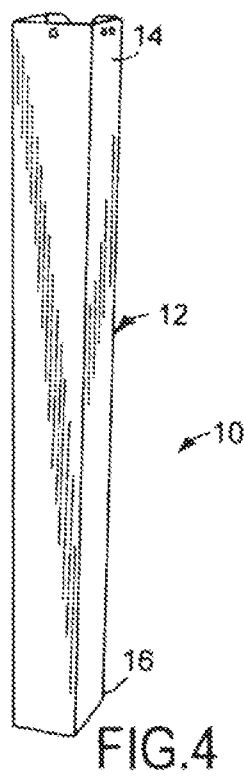
FIG. 4 is a rear perspective view illustrating the grow tube of the vertical hydroponic plant production apparatus of FIG. 3, constructed in accordance with the present invention.
Figure 5:
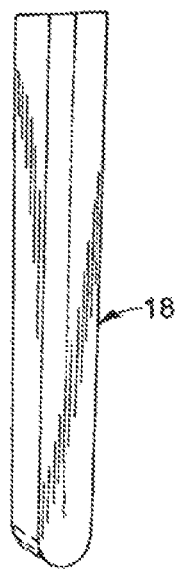
FIG. 5 is a front perspective view illustrating a media column of the vertical hydroponic plant production apparatus, constructed in accordance with the present invention.
Figure 6:
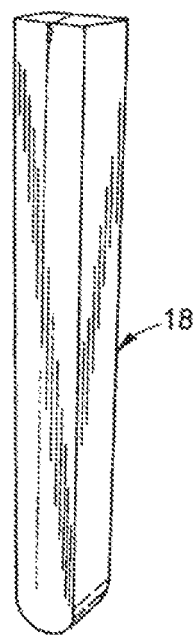
FIG. 6 is a rear perspective view illustrating the media column of the vertical hydroponic plant production apparatus of FIG. 5, constructed in accordance with the present invention.
Figure 7:
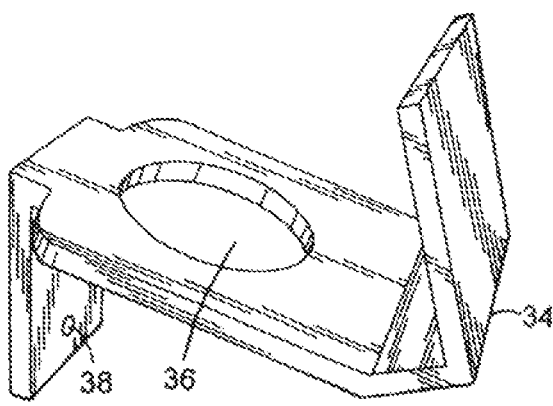
FIG. 7 is a perspective view illustrating a Z bracket of the vertical hydroponic plant production apparatus, constructed in accordance with the present invention.
Figure 8:
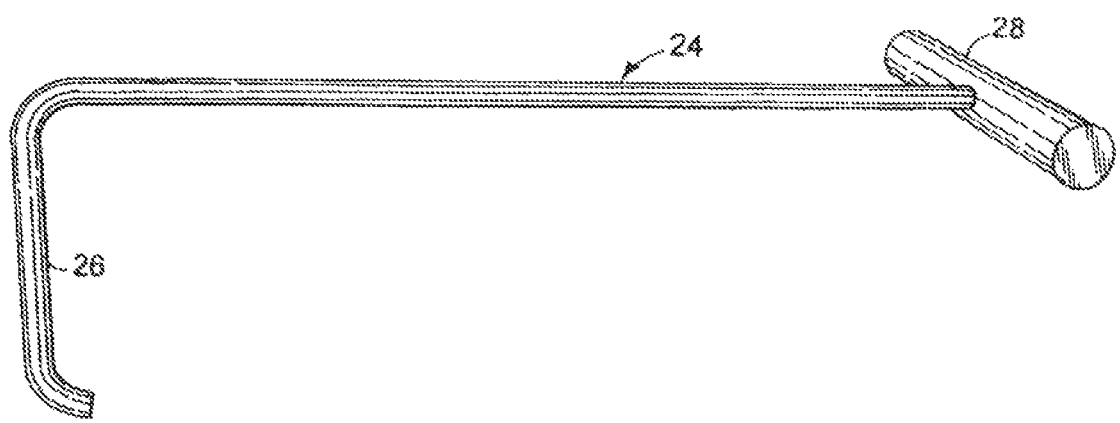
FIG. 8 is a perspective view illustrating a pulling hook of the vertical hydroponic plant production apparatus, constructed in accordance with the present invention.
Figure 9:
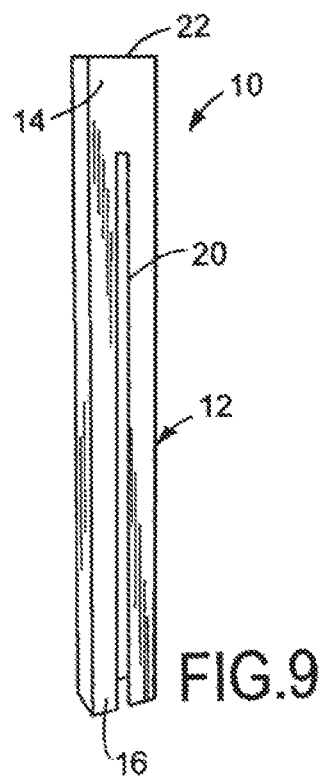
FIG. 9 is a perspective view illustrating the vertical hydroponic plant production apparatus, constructed in accordance with the present invention, with the slot formed to a point below the first end of the grow tube.
Figure 10:
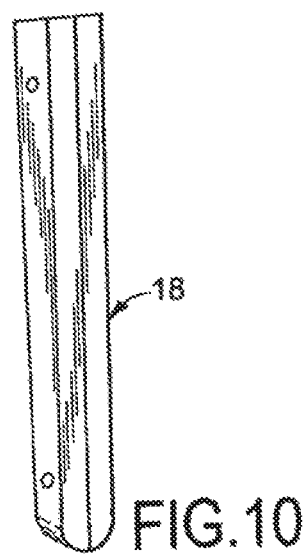
FIGS. 10-12 is a perspective view illustrating the vertical hydroponic plant production apparatus, constructed in accordance with the present invention, with the media material being composed of two halves of material split down the middle with a bolt spanning the width of the two halves.
Figure 11:
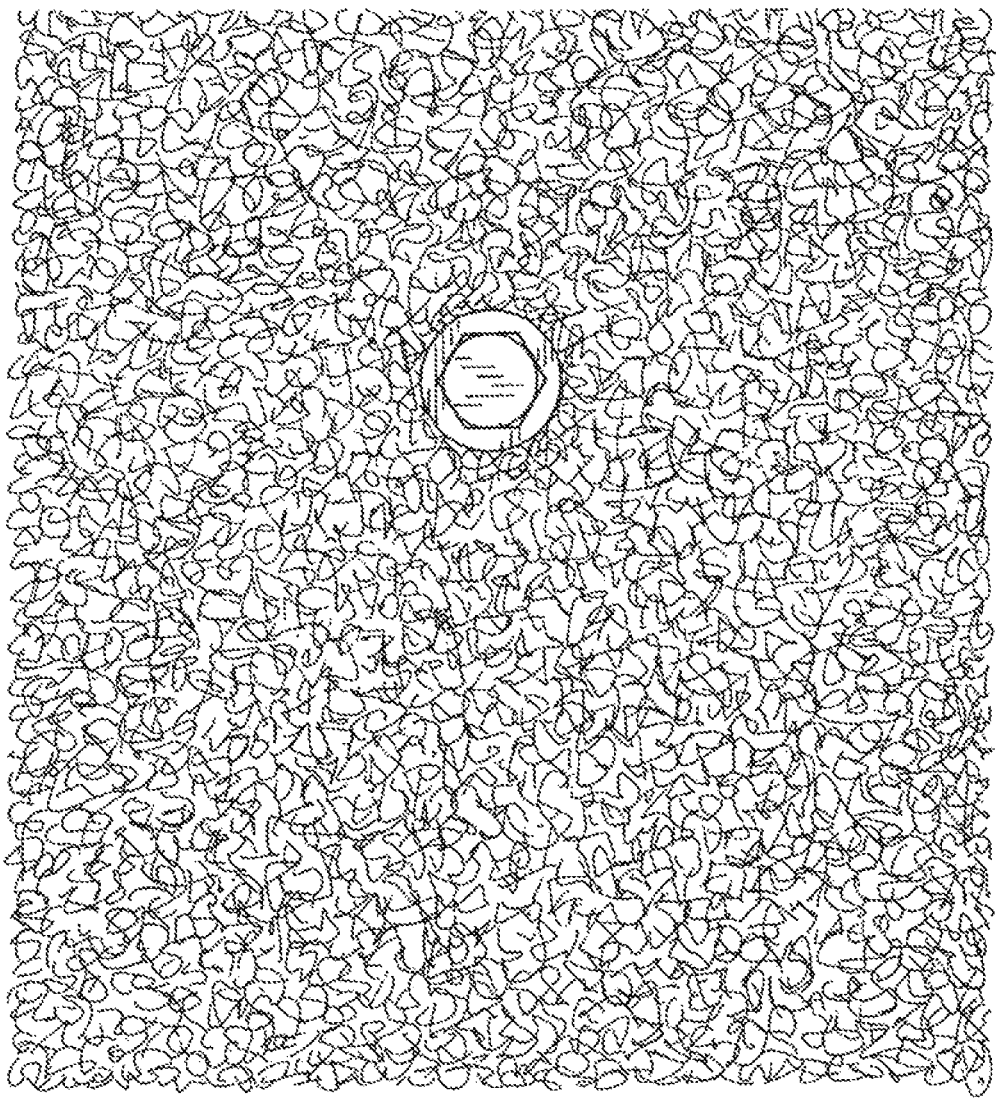
Figure 12:
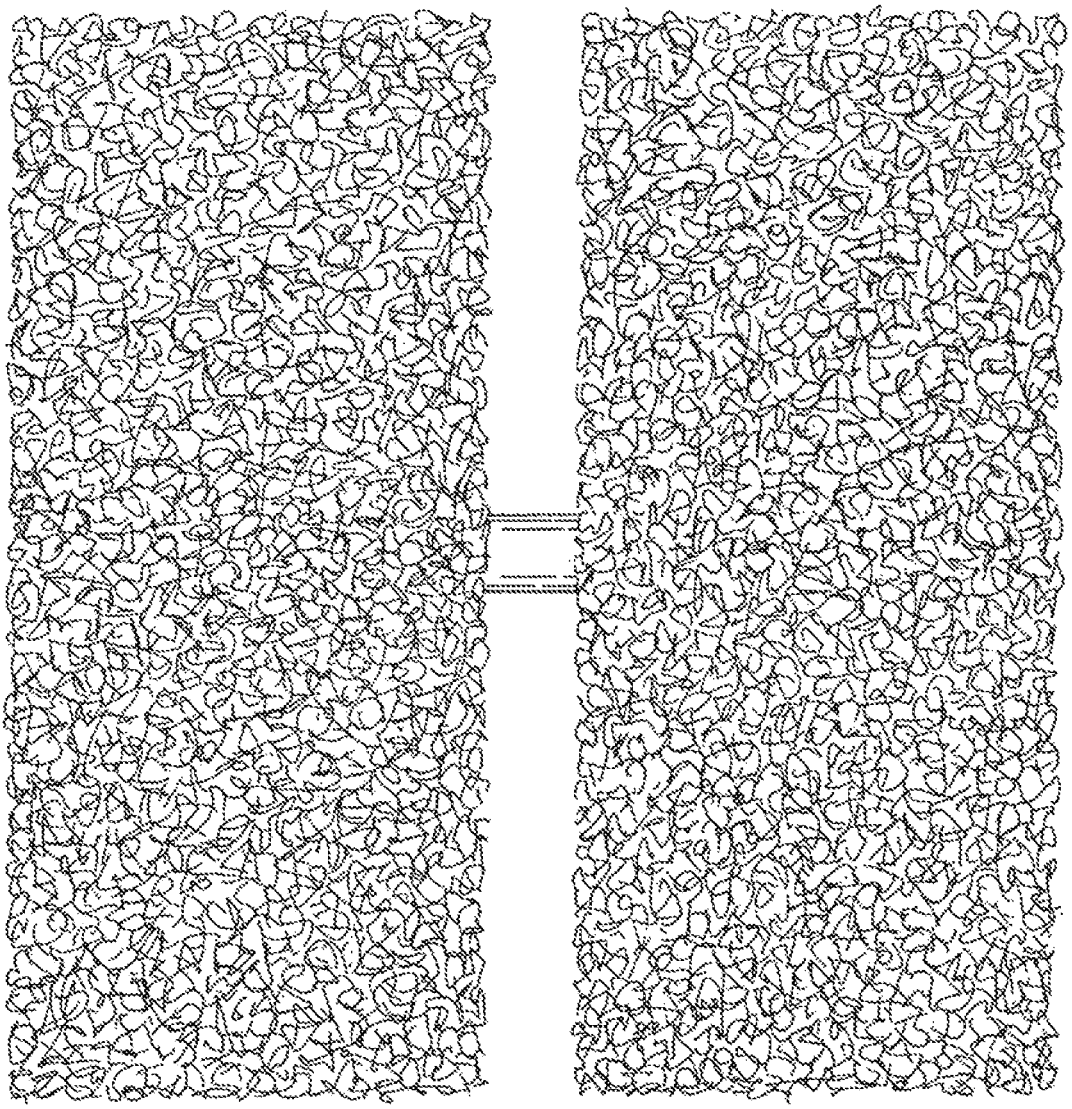
Figure 13:
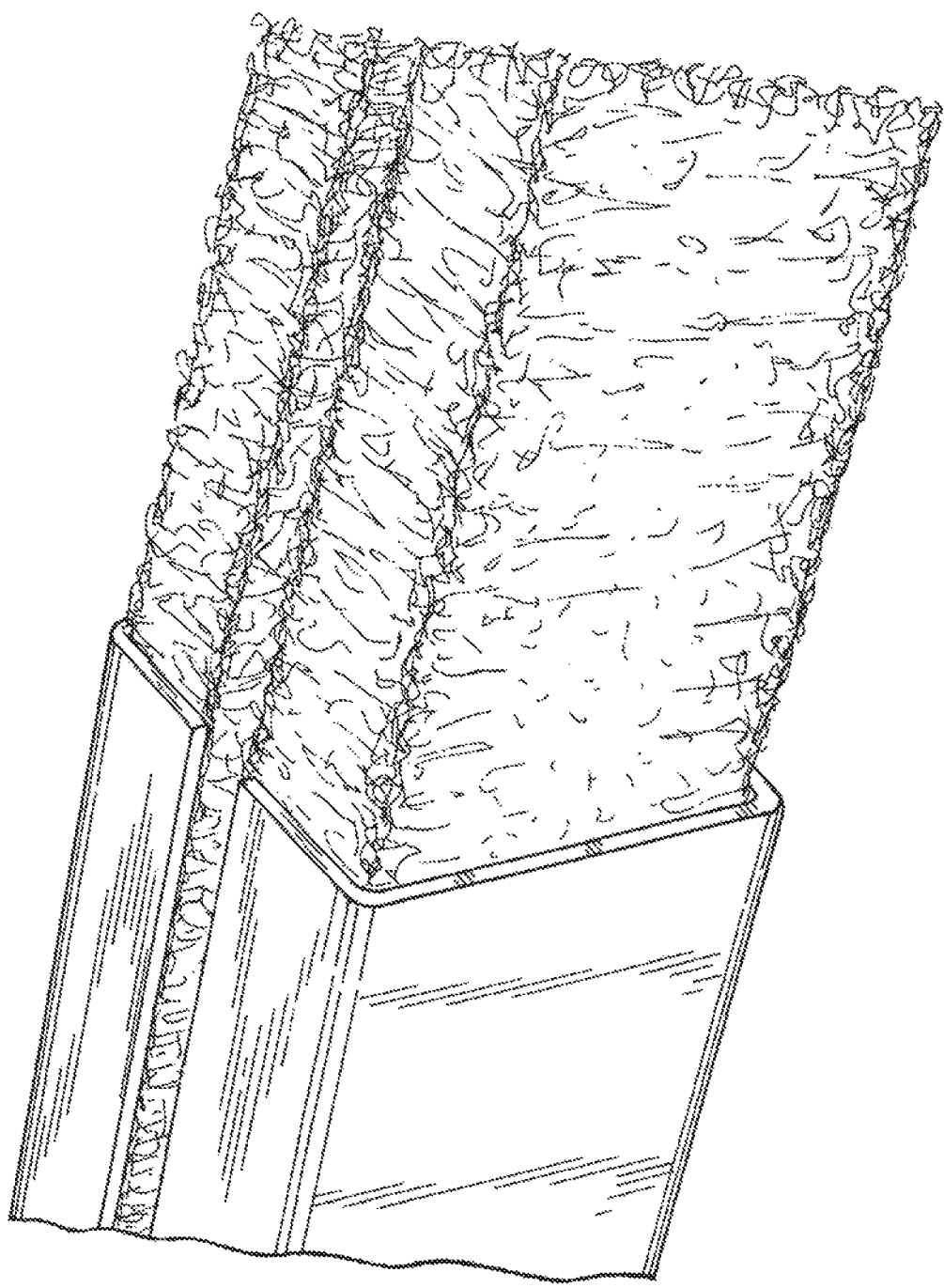
FIG. 13 is a perspective view illustrating the vertical hydroponic plant production apparatus, constructed in accordance with the present invention, with the media material having a thickness substantially half an internal width/diameter of the grow tube such that the media material is folded in the middle so that the thickness both halves together roughly equal the inside dimensions of the grow tube.
Figure 14:
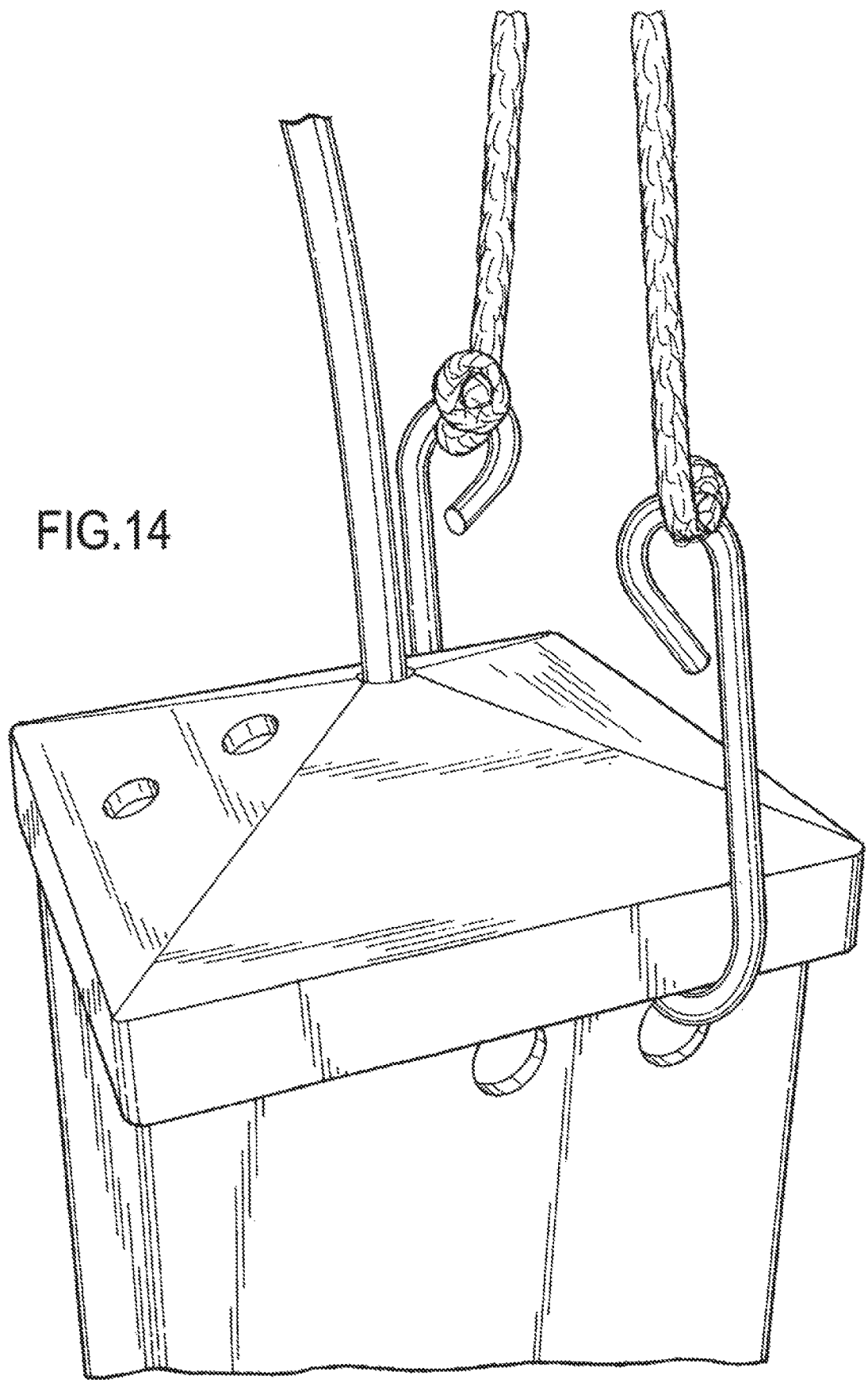
FIG. 14 is a perspective view illustrating the vertical hydroponic plant production apparatus, constructed in accordance with the present invention, with a cap and tubing extending through the cap.
Figure 15:
FIG. 15 is a perspective view illustrating the vertical hydroponic plant production apparatus, constructed in accordance with the present invention, with a nutrient solution reservoir.
Figure 16:
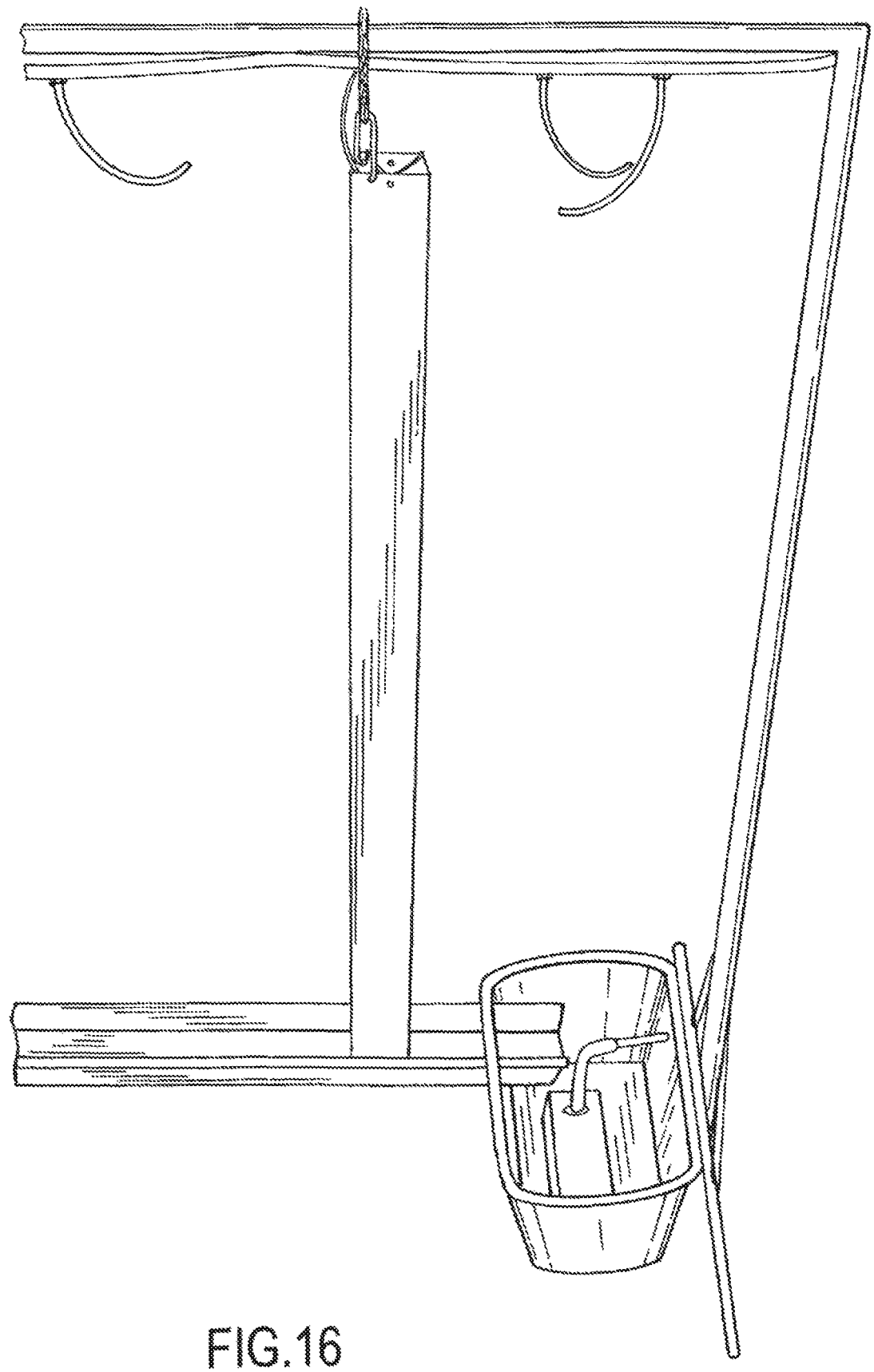
FIG. 16 is a perspective view illustrating the vertical hydroponic plant production apparatus, constructed in accordance with the present invention, with a pump.
Figure 17:
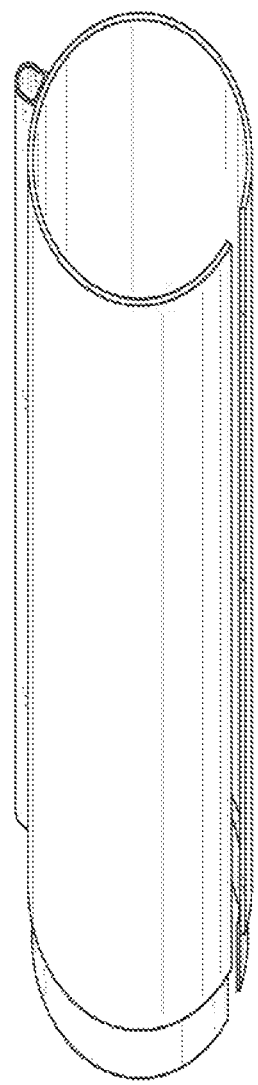
FIG. 17 is a front perspective view illustrating a round grow tube of a vertical hydroponic plant production apparatus, constructed in accordance with the present invention.

As illustrated in FIGS. 1-17, the present invention is a vertical hydroponic plant production apparatus, indicated generally at 10, allowing vertical hydroponic greenhouse crop production in a fraction of the space necessary for traditional plant production techniques and allows utilization of vertical surfaces for plant production.

The vertical hydroponic plant production apparatus 10 of the present invention includes a grow tube 12 useable in a horizontal position, vertical position, or any position between the horizontal position and the vertical position. The grow tube 12 is highly portable, being light, making it easy to move the grow tube 12 from area to area for transplant, grow out, and harvest. The grow tube 12 further allows inclined, multi-angled crop production and multi-storied conveyor style crop production. The grow tube 12 of the vertical hydroponic plant production apparatus 10 of the present invention also functions as aquacultural biofiltration/nutrient stripping devices for plant-based, high-efficiency waste nutrient removal and as sites nitrification processes, having massive surface area/volume thereby reducing the costs of single pass aquaculture and improving the efficiency of recirculating aquaculture.

The grow tube or tower 12 of the vertical hydroponic plant production apparatus 10 of the present invention also functions as in-store or at market display devices allowing the display of fresh, live produce for you-pick vegetable sales at market places and allowing the sale of produce that is more fresh than traditionally harvested vegetable products. Designed for easy affixation to the walls and/or roofs of buildings, the grow tube 12 reduces heating and cooling costs through shading and plant evapotranspiration and performs a decorative function. The grow tube 12 applied in such a manner can also reduce rooftop and hard surface water runoff depending on application and plumbing system.

Basically, the vertical hydroponic plant production apparatus 10 of the present invention allows for decorative landscape designs as well as vertical plant production displays indoors for a variety of purposes. The grow tubes or towers 12 can house aromatic and decorative species of herbs that may be used for aromatherapy type interactive hallways, lobby displays, kitchen, and cafeteria displays as well as common industrial plant displays in offices and workspaces.

The grow tube 12 of the vertical hydroponic plant production apparatus 10 of the present invention has a first end 14 and a second end 16 and is preferably a square, rectangular, round, oval, octagon, pentagon, triangular, or angular tubing containing a non-woven matrix media 18 composed of any number of plastic materials, suspended vertically from the ceiling, supported by a framework, and/or standing upright on the floor using a support pole or frame. Preferably, the grow tube 12 is constructed of a PVC plastic material with side walls having a width of approximately four (4") inches to six (6") inches although constructing the grow tube from a different material with different widths is within the scope of the present invention.

The grow tube 12 of the vertical hydroponic plant production apparatus 10 of the present invention has a slot 20 formed lengthwise through the grow tube 12. The slot 20 can be formed along the entire face of the grow tube 12 from the first end 14 to the second end 16 or the slot 20 can be formed to a point approximately four (4") inches to approximately six (6") inches from the first end 14 of the grow tube 12. In the case of the slot 20 formed along the entire face of the grow tube 12, the slot 20 can have angled portions 22 at the first end 14 of the grow tube 12 allowing for easy insertion and removal of the media, as will be described further below. Preferably, the slot 20 has a width of approximately one-half (½") inch to approximately one and one-half (1½") inches although constructing the slot 20 with different widths is within the scope of the present invention.

A variety of media material may be used with the system of the present disclosure. Examples of media that may be used in the system of the present disclosure may include but is not limited to, a fibrous, non-woven matrix media material, smaller media around plugs or potted plants, Styrofoam, polyurethane foam, plastic mesh, rock wool, coconut fiber, vermiculite, as well as organic soil such as potting soil.

As mentioned briefly above, the vertical hydroponic plant production apparatus 10 of the present invention has a media material 18 preferably constructed from a polyester matrix material approximately two (2") inches thick, cut to the internal width/diameter of the grow tube, and folded in the middle so that both halves together roughly equal the inside dimensions of the grow tube or tower housing 12. The media material 18 can also be composed of two halves of approximately two (2") inch thick media or one piece of four (4") inch thick media split down the middle to within approximately four (4") inches to approximately six (6") inches of the top of the media material where a bolt spans its width. In the bolt embodiment of the present invention, this bolt not only spans the width of the media insert 18, joining the two halves, and/or lending structural integrity to the media insert, but also anchors a handle or receiver to the media 18, allowing either the handle to be grasped for the purposes of inserting and removing the media 18 insert from the grow tube 12, or allowing a forked or hooked handle to be inserted into the receiver for the same purpose.

In the embodiment of the vertical hydroponic plant production apparatus 10 of the present invention where the media material 18 is folded in half, a pulling hook 24 with a flat hook 26 attached to a handle 28 allows the media inserts 18 to be pulled into and out of the grow tube 12, with the pulling hook handle 28 extending from the slot 20 in the grow tube 12. The hook 24 preferably consists of a piece of round bar metal bent to form a broad, flat, "L" shaped hook, roughly the width of the folded media 18 with a handle 28 affixed to the end. The hook 26 can also be attached to a pneumatic or hydraulic device that allows automated "pulling" of the media inserts 18.

For planting, seedlings are placed between the two halves of media 18 of the vertical hydroponic plant production apparatus 10 of the present invention, with the upper portions out, and are "zipped" into the grow tubes 12 with the upper portions of the plant protruding through the gap in the tower housing 12. The top of the grow tube 12 can be capped with a removable cap having holes of variable sizes drilled in the center, or may not be capped at all. If capped, a mister or irrigation tubing is inserted through the hole in the cap hole. The bottom of the grow tube 12 is either submerged in nutrient solution, rests in a drain or trough for recirculating nutrient solution, or fits into a lower pipe. A pump moves nutrient solution from a nutrient solution reservoir to the mister or irrigation pipe at the top of the grow tube 12, where the nutrient solution is emitted and allowed to drip down through the media 18 and plant roots. Some of the nutrient solution trickles down the walls of the pipe 12 and is captured by roots in contact with the pipe wall. Excess nutrient solution drains to the bottom of the pipe 12 where it is drained back to the nutrient solution reservoir. High humidity is maintained within the grow tube due to the constant trickling/misting of nutrient solution. The height of the plant grow tube 12 is variable dependent on greenhouse height, and the spacing for plants is variable dependent on plant type and desired spacing. It is possible to stack grow tubes 12 on top of each other to vary height, by fitting the bottoms of the grow tubes 12 with coupling caps, to utilize conveyor production techniques.

The grow tubes 12 of the vertical hydroponic plant production apparatus 10 of the present invention can be fixed in place using hangers, rope, or strap and metal hooks that loop over a support beam or bracket and secure to the grow tube 12 or tower through holes 30 drilled at the first end of the grow tube 12. The holes 30 can be of variable size and placement depending on application, although in the most common embodiment, there are four holes 30, one pair centered on either side of the housing upper, and one pair forward (towards the front of the grow tube 12) of the centered pair allowing slight inclination of the hanging tower 12 if inclined growing is desired. The grow tubes 12 can also be fixed in place using a series of holes or a gap cut in the grow tube 12 allowing the grow tube to be fixed to a pole having a bracket or pressure or spring action hanging system attached to it. The grow tube 12 can also be inclined on said pole or hanging system for the purpose of inclined production.

The grow tube 12 of the vertical hydroponic plant production apparatus 10 of the present invention can also be secured to a support pole utilizing a system of metal brackets whereas one bracket type is female and is designated as an "H" bracket 32 and the other bracket type is male and is designated as a "Z" bracket 34. The female "H" bracket 32 has a receiving portion and an anchoring portion to bolt to the back or side of the tower 12. The male "Z" bracket 34 consists of a vertical, upward facing tongue portion that fits into the receiving portion of the female bracket 32, and has a hole 36 through the middle, angled portion of the bracket 34 which fits over a support pole. The rear, downward facing vertical portion of the bracket 34 has a hole 38 drilled midway across the bottom of the bracket 34 and is threaded to receive a bolt. As weight is applied to the tongue portion of the bracket 34 through the placement of a bracketed tower, downward torque is applied across the "Z" bracket 34 causing a clutch action to affix the bracket tightly to the support pole. The torque attachment of this "Z" bracket 34 can be enhanced by tightening the bolt threaded into the rear of the bracket 34 against the support pole, applying even more pressure for bracket attachment.

In another embodiment, either the "Z" bracket 34 or the "H" bracket may be replaced with a vertical bar. The tower 12 is mounted to a vertical bar by means of the H bracket. This mode of action can be accomplished with a H bracket attached to a tower allowing the tower to slide down a pole, or with an H bracket (or variation on the basic form of the H bracket) attached to the back of the tower that allows it to slide onto a vertical bar to be mounted. H and Z brackets but using just a single e bracket attached to the back of the tower in a way that allows the tower to slide onto a bar or pole to be mounted and allows one tower to be mounted above another.

The media insert 18 of the vertical hydroponic plant production apparatus 10 of the present invention can also be altered in several ways to serve a diverse range of functions. The media 18 can be cut at a taper from the unfastened or unfolded end to the fastened or folded end, reserving a tapered space at the rear of the insert to allow compost, alternate plant media, fertilizing substance or some type of soil amendment or additive to be held in the space between the tapered media insert and the rear and sidewalls of the tower housing 12. This alteration allows compost based hydroponic plant production using regular irrigation water, with plant nutrients supplied by the compost or other additive. Tops, sides, and corners of the media insert 18 can also be cut, rounded, or cut at an angle to reduce biosolids accumulation, algal growth, or to enhance water distribution through the media 18, depending on application. Multiple inserts 18 can also be used in towers 12 allowing multiple age groups of plants to incorporated into each grow tube 12. Worms are also commonly integrated into the grow tubes 12 and the media is designed to have the correct mesh size to accommodate their movement through the media 18, although media 18 with a smaller or larger mesh size may be used depending on application.

The vertical hydroponic plant production apparatus 10 of the present invention is comparatively lightweight, inexpensive to manufacture (being based on common PVC extrusion techniques) and existing polyethylene matrix material production, will not clog with nutrient solution, and requires much less labor to operate. The present invention can also be converted to more traditional horizontal production techniques if desired, eliminating the risk inherent in changing production techniques for commercial producers.

In addition, traditional nitrogen and phosphorus removal techniques in aquaculture are very poor compared to removal using plant uptake for phytoremediation. Plants are able to remove N and P to levels an order of magnitude lower than any mechanical/chemical/microbial technique currently in use. The present invention phytoremediates water allowing for prolonged water use/recirculation and water conservation.

The vertical hydroponic plant production apparatus 10 of the present invention is an improvement on traditional harvesting and sales models where production systems are physically removed from the sales systems and shipping and handling results in a large percentage of producer losses, both financially as wasted or expired produce. By selling live plants, there is no spoilage and shipping and handling is done partially by producers moving towers to market places, but primarily by consumers who are interested in fresh produce and the experience of picking and harvesting vegetables, herbs and greens for their own use. The grow tubes are easily transported and easy to stack, lift, and slide onto shelves. They essentially operate as a packaging system as well as a plant production system. Further, by utilizing individual towers, landscape designers and home users can scale their display or production system exactly to their specifications.

The vertical hydroponic plant production apparatus 10 of the present invention reduces necessary growing space tremendously. Typical reductions in growing space utilizing a vertical aeroponic technique have varied between 60% and 85% compared to conventional growth methods. Greenhouse growing space is very expensive, so the ability to increase crop size without increasing greenhouse space could prove very profitable. The present invention is also very affordable to manufacture, building on existing PVC pipe production infrastructure. Implementation of the present invention will also be simple, building on current hydroponic production technology.

The increased water recirculation time achieved with the vertical hydroponic plant production apparatus 10 of the present invention can eliminate one of the high costs and reduce the negative environmental effects of aquaculture, resulting in increased profits and a better industry image for aquacultural producers. Using the present invention can also allow aquacultural producers to diversify their product base and/or grow supplementary feed products (depending on the dietary needs of the fish).

The vertical hydroponic plant production apparatus 10 of the present invention has the potential to open up an entirely new system of production, transportation, shipping, handling, and display to vegetable producers, retailers, and consumers. This can result in fresher produce, a more pleasant customer shopping experience, reduced waste, reduced handling and packaging costs, fewer food miles, less plastic and packaging material consumption, and longer shelf life of purchased produce.

The vertical hydroponic plant production apparatus 10 of the present invention can be used by industrial institutions for phytoremediation of waste waters, using the towers as trickling, plant integrated filters for the removal of waste materials, and the remediation of waste waters for discharge.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements, which are disclosed herein.

What is claimed is:

1. A vertical hydroponic plant production apparatus for allowing vertical hydroponic greenhouse crop production, the apparatus comprising:
    a hollow grow tube having a front face, a back face, an open first end, and an open second end and wherein said hollow grow tube has an internal width;
    wherein each grow tube has a length between the first end and the open second end and the front face has a width, and wherein the length of each grow tube is larger than the width of the front face;
    a slot formed in the front face of the grow tube, wherein said slot is formed along the entire length of said front face of each grow tube from the first end to the second end or to a point approximately four (4") inches to approximately six (6") inches from the first end of each grow tube;
    a media material having a thickness substantially half the internal width of the grow tube, wherein the media material is capable of being posited into two equal lengths so that the thickness of both halves of said media material are approximately equal to the internal width of the grow tube;
    wherein said grow tube is adapted to receive said media material, and wherein said media material is supported by the faces of the grow tube; and
    wherein the grow tube is positionable in a vertical position or semi vertical position;
    wherein said grow tube is configured to allow plants to be inserted into the media material and grown through said slot;
    and
    wherein the grow tube has a shape selected from substantially square, rectangular, round, oval, octagon, pentagon and triangular.

2. The apparatus of claim 1, wherein said media material is chosen from a fibrous, non-woven media material, Styrofoam, polyurethane foam, and plastic mesh.

3. The apparatus of claim 1 wherein the slot is formed along the entire front face of the grow tube from the first end to the second end.

4. The apparatus of claim 3 wherein the slot has angled portions at the first end of the grow tube.

5. The apparatus of claim 1 wherein the slot is formed from the second end to a point short of the first end.

6. The apparatus of claim 1 and further comprising:
    a nutrient solution reservoir, the second end of the grow tube being submerged in the reservoir;
    tubing;
    and
    a pump for pumping nutrient solution from the reservoir into the grow tube through the tubing.

7. The apparatus of claim 1 and further comprising:
holes formed in sides of the grow tube to hang the grow tube in a desired position from an overhead bar or beam with a flexible line and wire hooks, or to allow the grow tube/tower to be mounted on an upright support post.

8. The apparatus of claim 1 and further comprising:
a "H" bracket having a receiving portion and an anchoring portion, the "H" bracket mounted to the back face of the grow tube; a "Z" bracket having a vertical, upward facing tongue portion receivable within the receiving portion of the "H" bracket, the "Z" bracket mounted in a predetermined location; and
an aperture formed in the "Z" bracket for receiving a fastening mechanism; wherein as weight is applied to the tongue portion of the "Z" bracket through the placement of the grow tube, downward torque is applied across the "Z" bracket causing a clutch action to affix the "Z" bracket tightly to the predetermined location.

9. The apparatus of claim 1, wherein the slot has a width between $1/12$ to $3/4$ the width of the face of the grow tube.

10. A method for allowing vertical hydroponic greenhouse crop production, the method comprising:
providing a hollow grow tube having a front face, a back face, a first end, and a second end and wherein said hollow grow tube has an internal width, wherein the grow tube has a shape selected from substantially square, rectangular, round, oval, octagon, pentagon and triangular;
wherein each grow tube has a length between the first end and the second end and the front face has a width, and wherein the length of each grow tube is larger than the width of the front face;
forming a slot in the front face of the grow tube, wherein said slot is formed along the entire length of said front face of each grow tube from the first end to the second end or to a point approximately four (4") inches to approximately six (6") inches from the first end of each grow tube;
providing a media material having a thickness substantially half the internal width of the grow tube, wherein the media material is capable of being posited into two equal lengths so that the thickness of both halves of said media material are approximately equal to the internal width of the grow tube and wherein the media material is capable of receiving one or more plants into said media material and capable of allowing one or more plants to root and grow in said media material;
wherein said grow tube is adapted to receive said media material, and wherein said media material is supported by the faces of the grow tube; and
wherein the grow tube is positioned in a vertical position or semi vertical position.

11. The method of claim 10, wherein said media material is chosen from a fibrous, non-woven media material, Styrofoam, polyurethane foam, and plastic mesh.

12. The method of claim 10, wherein the slot is formed along the entire front face of the grow tube from the first end to the second end.

13. The method of claim 10 wherein the slot has angled portions at the first end of the grow tube.

14. The method of claim 10 wherein the slot is formed from the second end to a point short of the first end.

15. The method of claim 10 and further comprising:
providing a nutrient solution reservoir and positioning the second end of the grow tube so that said second end is submerged in the reservoir;
providing tubing;
and
providing a pump, wherein said pump circulates nutrient solutions from the reservoir into the grow tube through the tubing.

16. The method of claim 10 and further comprising:
providing holes formed in sides of the grow tube, wherein said holes form in the side of the grow tube allow said grow tube to hang in a desired position from an overhead bar or beam with a flexible line and wire hooks, or to allow the grow tube/tower to be mounted on an upright support post.

17. The method of claim 10 and further comprising:
providing a "H" bracket having a receiving portion and an anchoring portion; wherein said "H" bracket is mounted to the rear face of the grow tube;
providing a "Z" bracket having a vertical, upward facing tongue portion receivable within the receiving portion of the "H" bracket, the "Z" bracket mounted in a predetermined location; and
providing an aperture formed in the "Z" bracket for receiving a fastening mechanism; wherein as weight is applied to the tongue portion of the "Z" bracket through the placement of the grow tube, downward torque is applied across the "Z" bracket causing a clutch action to affix the "Z" bracket tightly to the predetermined location.

18. The method of claim 10, wherein the slot has a width between $1/12$ to $3/4$ the width of the face of the grow tube.

* * * * *